(12) United States Patent
Sanders et al.

(10) Patent No.: US 9,282,518 B2
(45) Date of Patent: Mar. 8, 2016

(54) METHODS AND SYSTEMS FOR PRESERVING THE LIFE OF A TRANSPORT REFRIGERATION SYSTEM POWER SOURCE

(71) Applicants: THERMO KING CORPORATION, Minneapolis, MN (US); ROBERTSHAW CONTROLS COMPANY, Carol Stream, IL (US)

(72) Inventors: Russell Lee Sanders, Minnetonka, MN (US); Mark Daniel Leasure, Eagan, MN (US); Kim Vitkus, Sycamore, IL (US); Mark Johnson, Wheaton, IL (US)

(73) Assignees: THERMO KING CORPORATION, Minneapolis, MN (US); INVENSYS SYSTEMS, INC., Foxboro, MA (US)

( * ) Notice: Subject to any disclaimer, the term of this patent is extended or adjusted under 35 U.S.C. 154(b) by 421 days.

(21) Appl. No.: 13/848,425

(22) Filed: Mar. 21, 2013

(65) Prior Publication Data

US 2013/0285441 A1    Oct. 31, 2013

Related U.S. Application Data

(60) Provisional application No. 61/613,944, filed on Mar. 21, 2012, provisional application No. 61/787,691, filed on Mar. 15, 2013, provisional application No. 61/613,956, filed on Mar. 21, 2012, provisional (Continued)

(51) Int. Cl.
*B60R 16/03* (2006.01)
*H04W 52/02* (2009.01)

(Continued)

(52) U.S. Cl.
CPC ............ *H04W 52/0261* (2013.01); *B60H 1/00* (2013.01); *B60H 1/00014* (2013.01);

(Continued)

(58) Field of Classification Search
CPC ... H02J 4/00; H04W 52/0261; B60H 1/00014
See application file for complete search history.

(56) References Cited

U.S. PATENT DOCUMENTS 4,647,787 A * 3/1987 Pommer, II .................. 379/413
5,361,985 A    11/1994 Rein et al.

(Continued)

FOREIGN PATENT DOCUMENTS

| JP | 09-126902 | 5/1997 |
|---|---|---|
| JP | 09-196768 | 7/1997 |

(Continued)

OTHER PUBLICATIONS

International Search Report for PCT/US2013/033296 dated Jun. 21, 2013, 3 pages.

(Continued)

*Primary Examiner* — Thienvu Tran
*Assistant Examiner* — Pinping Sun
(74) *Attorney, Agent, or Firm* — Hamre, Schumann, Mueller & Larson, P.C.

(57) ABSTRACT

Methods and systems for preserving the life of a transport refrigeration system power source are provided. The method can include determining whether a control unit of the transport refrigeration system is off. Also, the method can include measuring an input voltage of a network coordinator when the control unit is off. Further the method can include instructing one or more parasitic electronic devices of the transport refrigeration mode to operate in a hibernation mode when the input voltage of the transport refrigeration system power source remains below a voltage threshold value for a time period and the control unit is off.

8 Claims, 3 Drawing Sheets

Related U.S. Application Data application No. 61/613,949, filed on Mar. 21, 2012, provisional application No. 61/613,952, filed on Mar. 21, 2012, provisional application No. 61/787,719, filed on Mar. 15, 2013, provisional application No. 61/613,946, filed on Mar. 21, 2012.

(51) Int. Cl.
| | | |
|---|---|---|
| *F25B 49/00* | (2006.01) | |
| *H02J 4/00* | (2006.01) | |
| *G08C 17/02* | (2006.01) | |
| *F25D 29/00* | (2006.01) | |
| *B60H 1/00* | (2006.01) | |

(52) U.S. Cl.
CPC .............. *B60R 16/03* (2013.01); *F25B 49/00* (2013.01); *F25D 29/003* (2013.01); *G08C 17/02* (2013.01); *H02J 4/00* (2013.01); *H04W 52/02* (2013.01); *F25B 2600/07* (2013.01); *Y10T 307/406* (2015.04)

(56) References Cited

U.S. PATENT DOCUMENTS

| | | | |
|---|---|---|---|
| 5,557,096 A | | 9/1996 | Watanabe et al. |
| 5,720,171 A | | 2/1998 | Osterhoff et al. |
| 5,729,061 A | * | 3/1998 | Narita ............... 307/130 |
| 5,907,491 A | | 5/1999 | Canada et al. |
| 6,121,694 A | * | 9/2000 | Thereze ............. 307/64 |
| 6,467,694 B1 | | 10/2002 | Jerome |
| 6,553,336 B1 | | 4/2003 | Johnson et al. |
| 6,593,845 B1 | | 7/2003 | Friedman et al. |
| 6,693,511 B1 | | 2/2004 | Seal |
| 6,709,784 B2 | * | 3/2004 | Resch et al. ............ 429/123 |
| 6,721,546 B1 | | 4/2004 | Compton |
| 6,744,352 B2 | | 6/2004 | Lesesky et al. |
| 6,844,829 B2 | * | 1/2005 | Mayor ............... 341/27 |
| 6,863,222 B2 | | 3/2005 | Slifkin et al. |
| 6,917,857 B2 | | 7/2005 | Rentmeester et al. |
| 6,922,558 B2 | | 7/2005 | Delp et al. |
| 7,026,929 B1 | | 4/2006 | Wallace |
| 7,260,732 B1 | | 8/2007 | Bittner, Jr. |
| 7,425,945 B2 | * | 9/2008 | Arrigo et al. ............ 345/165 |
| 7,612,652 B2 | | 11/2009 | Stewart et al. |
| 7,647,078 B2 | | 1/2010 | Kim et al. |
| 7,689,850 B2 | * | 3/2010 | Cantwell et al. ............ 713/323 |
| 7,743,616 B2 | | 6/2010 | Renken et al. |
| 7,784,707 B2 | | 8/2010 | Witty et al. |
| 7,812,733 B2 | * | 10/2010 | Perten et al. ............ 340/635 |
| 7,831,282 B2 | | 11/2010 | Luebke |
| 7,878,008 B1 | | 2/2011 | Mateski et al. |
| 7,903,494 B2 | | 3/2011 | Battista |
| 7,940,716 B2 | | 5/2011 | Twitchell, Jr. |
| 7,952,485 B2 | | 5/2011 | Schechter et al. |
| 7,969,912 B2 | | 6/2011 | Jeon et al. |
| 7,992,421 B2 | | 8/2011 | Jeftic-Stojanovski et al. |
| 7,995,339 B2 | | 8/2011 | Bash et al. |
| 8,035,508 B2 | | 10/2011 | Breed |
| 8,047,432 B2 | | 11/2011 | Breed |
| 8,054,120 B2 | * | 11/2011 | Huber et al. ............ 327/198 |
| 8,115,620 B2 | | 2/2012 | Breed |
| 8,248,252 B2 | | 8/2012 | Schechter et al. |
| 8,269,627 B2 | | 9/2012 | Gore et al. |
| 8,307,667 B2 | | 11/2012 | Rusignuolo et al. |
| 8,350,534 B2 | * | 1/2013 | Niculae et al. ............ 320/162 |
| 8,533,509 B2 | * | 9/2013 | Kamijima ............ 713/320 |
| 8,590,330 B2 | * | 11/2013 | Walker et al. ............ 62/236 |
| 2002/0187025 A1 | | 12/2002 | Speasl et al. |
| 2003/0000236 A1 | * | 1/2003 | Anderson et al. ............ 62/228.3 |
| 2005/0232747 A1 | | 10/2005 | Brackmann et al. |
| 2006/0202859 A1 | | 9/2006 | Mastrototaro et al. |
| 2006/0279424 A1 | | 12/2006 | Yoong |
| 2007/0193289 A1 | | 8/2007 | Matsui et al. |
| 2007/0267509 A1 | | 11/2007 | Witty et al. |
| 2008/0077260 A1 | | 3/2008 | Porter et al. |
| 2008/0107933 A1 | * | 5/2008 | Gallagher ............ 429/17 |
| 2008/0168807 A1 | * | 7/2008 | Dion et al. ............ 70/94 |
| 2008/0252469 A1 | | 10/2008 | Perten et al. |
| 2009/0015400 A1 | | 1/2009 | Breed |
| 2009/0037142 A1 | | 2/2009 | Kates |
| 2009/0058593 A1 | | 3/2009 | Breed |
| 2009/0061897 A1 | | 3/2009 | Hamilton et al. |
| 2009/0135000 A1 | | 5/2009 | Twitchell, Jr. |
| 2009/0139246 A1 | | 6/2009 | Lifson et al. |
| 2009/0140858 A1 | | 6/2009 | Gore et al. |
| 2009/0143923 A1 | | 6/2009 | Breed |
| 2009/0216497 A1 | | 8/2009 | Schwiers et al. |
| 2009/0237258 A1 | * | 9/2009 | Heck et al. ............ 340/585 |
| 2009/0272132 A1 | | 11/2009 | Rusignuolo et al. |
| 2010/0102136 A1 | | 4/2010 | Hadzidedic et al. |
| 2010/0127881 A1 | | 5/2010 | Schechter et al. |
| 2010/0176170 A1 | | 7/2010 | O'Hare |
| 2010/0250009 A1 | | 9/2010 | Lifson et al. |
| 2010/0274604 A1 | | 10/2010 | Crilly |
| 2010/0305794 A1 | | 12/2010 | Foster |
| 2011/0012731 A1 | | 1/2011 | Stevens |
| 2011/0059779 A1 | | 3/2011 | Thomas et al. |
| 2011/0185749 A1 | | 8/2011 | Metzger |
| 2011/0193710 A1 | | 8/2011 | McIlvain et al. |
| 2012/0026016 A1 | | 2/2012 | Mitchell et al. |
| 2012/0028680 A1 | | 2/2012 | Breed |

FOREIGN PATENT DOCUMENTS

| | | |
|---|---|---|
| JP | 2001-324253 | 11/2001 |
| JP | 2003-214747 | 7/2003 |
| JP | 2005-234815 | 9/2005 |
| JP | 2007-228373 | 9/2007 |
| JP | 2008-185241 | 8/2008 |
| WO | 2005/043446 | 5/2005 |
| WO | 2008/153518 | 12/2008 |

OTHER PUBLICATIONS

Written Opinion for PCT/US2013/033296 dated Jun. 20, 2013, 4 pages.
CargoLink Wireless Sensors, Wireless Sensor System Saves Money, Reduces Maintenance and Offers Increased Load Protection, Thermo King Corporation, Copyright 2011, 4 pages.
Installation Manual, Truck and Trailer Edition, WPAN Installation Manual, Thermo King Corporation, Copyright 2012, 28 pages.
Transport Wireless Technologies Inc., www.transportwireless.com, Copyright 2013, Last accessed Mar. 2012, 1 page.
TRMS-200, Transport Refrigeration Wireless Sensors, Door Switch Sensoers and Fuel Level Sensor, Transport Refrigeration Wireless Technologies, 2 pages.

* cited by examiner

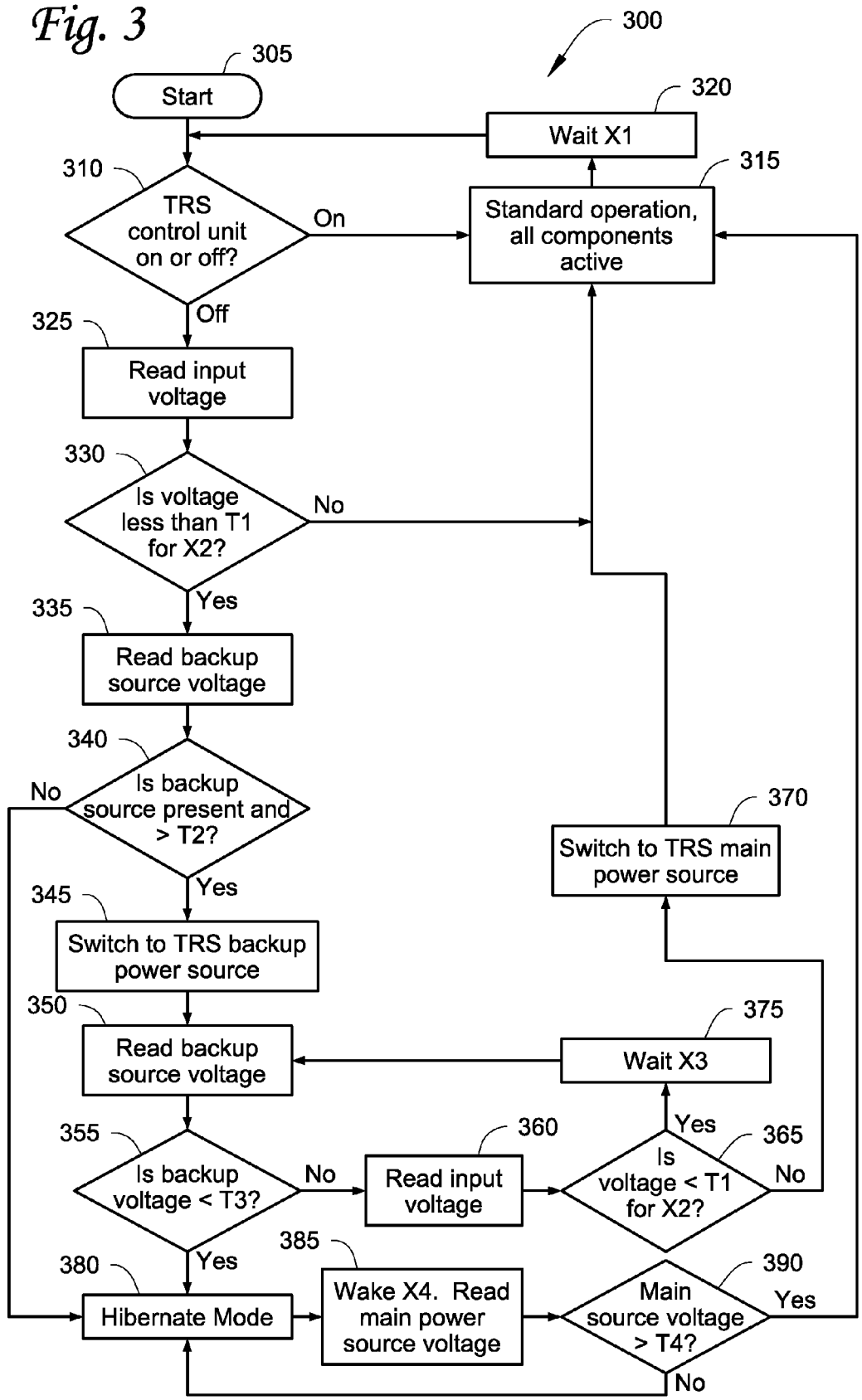

METHODS AND SYSTEMS FOR PRESERVING THE LIFE OF A TRANSPORT REFRIGERATION SYSTEM POWER SOURCE

FIELD

The embodiments disclosed herein relate generally to a transport refrigeration system. More particularly, the embodiments relate to preserving the life of a transport refrigeration system power source.

BACKGROUND

Existing transport refrigeration systems are used to cool containers, trailers, and other similar transport units (typically referred to as a "reefer"). Modern reefers may be efficiently stacked for shipment by ship or rail. Typically, when reefers are shipped by truck, a single reefer is placed on a trailer chassis. When cargo in the container includes perishable products (e.g., food product, flowers, etc.), the temperature of the reefer must be controlled to limit loss of the cargo during shipment.

SUMMARY

The embodiments described herein are directed to preserving the life of a transport refrigeration system power source.

In one embodiment, a method for preserving the life of a transport refrigeration system power source is provided. The method can include determining whether a control unit of the transport refrigeration system is off. Also, the method can include measuring an input voltage of the transport refrigeration system power source when the control unit is off. Further the method can include instructing one or more parasitic electronic devices of the transport refrigeration mode to operate in a hibernation mode when the input voltage of the transport refrigeration system power source remains below a voltage threshold value for a time period and the control unit is off.

In another embodiment, a transport refrigeration system is provided. The transport refrigeration system includes a control unit, an engine connected to the control unit, a power source connected to the control unit and the engine and one or more parasitic electronic devices. The one or more parasitic electronic devices are connected to the control unit and the power source and are configured to draw current from the power source when the control unit is off. The control unit is configured to instruct the one or more parasitic electronic devices to operate in a hibernation mode when the control unit is off and an input voltage of the power source remains below a voltage threshold for a time period.

BRIEF DESCRIPTION OF THE DRAWINGS

Referring now to the drawings in which like reference numbers represent corresponding parts throughout.

FIG. 3 illustrates a flow chart of an embodiment of preserving the life of a transport refrigeration system power source.

DETAILED DESCRIPTION

The embodiments described herein are directed to preserving the life of a transport refrigeration system power source.

References are made to the accompanying drawings that form a part hereof, and in which is shown by way of illustration of the embodiments in which the methods and systems described herein may be practiced. The term "reefer" generally refers to, for example, a temperature controlled trailer, container, or other type of transport unit, etc. The term "transport refrigeration system" refers to a refrigeration system for controlling the refrigeration of an in internal space of the reefer. The term "wireless communication system" refers to a communication system that is configured to transmit data over a short distance in a mobile environment, such as, for example, between different points of a reefer that is in transport. The term "wireless end node" refers to an electronic device that is an endpoint of a wireless communication system and is capable of monitoring a property of a transport refrigeration system and transmitting data transmissions to and receiving data transmissions from a network coordinator of the wireless communication system. The term "network coordinator" refers to an electronic device that is configured to manage, command, direct and regulate the behavior of one or more wireless end nodes of the wireless communication system. The term "parasitic electronic device" refers to any electronic device that can drain power from the transport refrigeration system when a transport refrigeration system control unit is off and that is outside of the native control of the transport refrigeration system. The term "transport refrigeration control unit" refers to an electronic device that is configured to manage, command, direct and regulate the behavior of one or more TRS refrigeration components (e.g., an evaporator, a blower, a heat exchanger, etc.), a TRS engine, a TRS main power source, a TRS backup power source (if included in the transport refrigeration system), a TRS fuel tank, etc.

Figure 1:
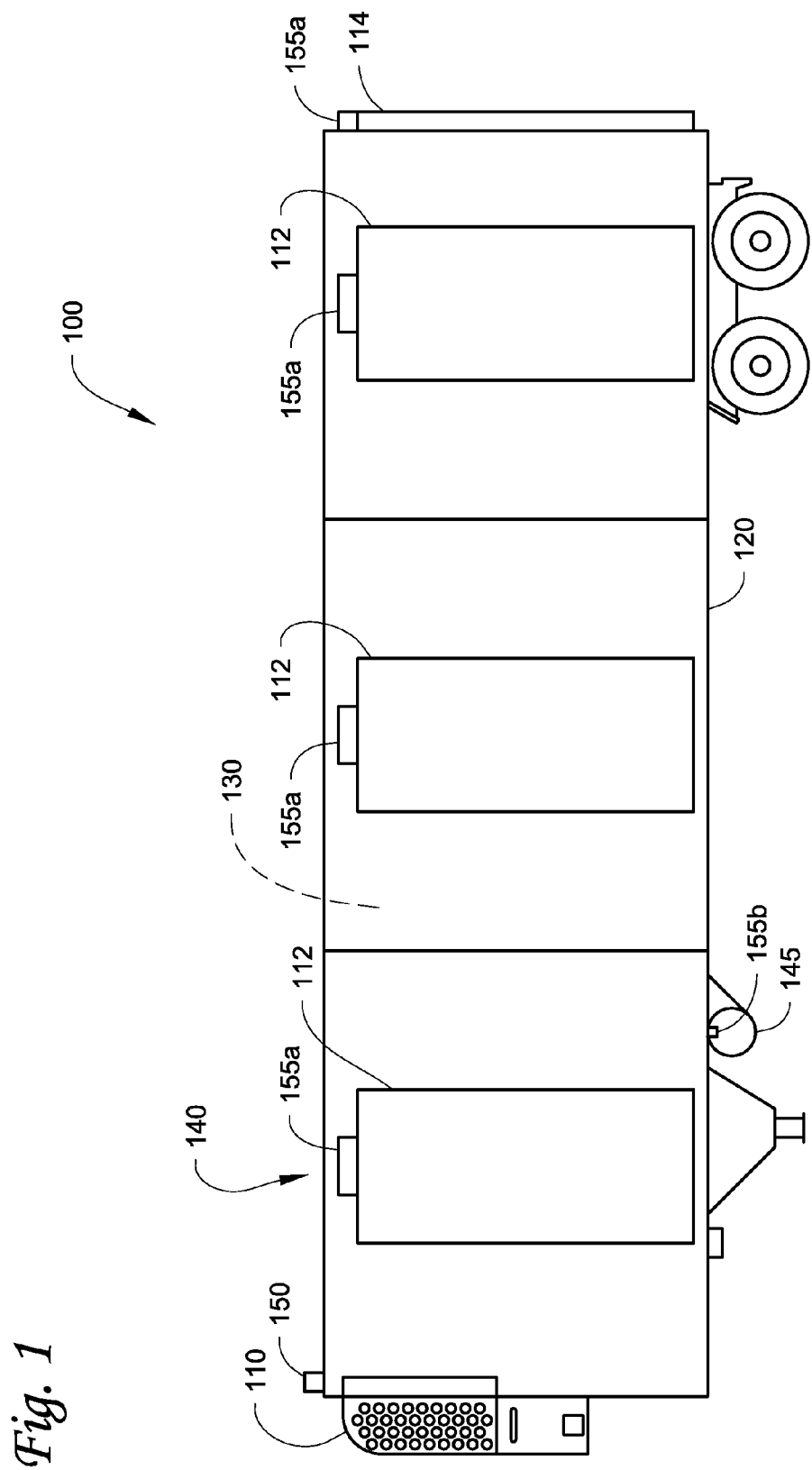
FIG. 1 illustrates a side view of an embodiment of a transport temperature controlled trailer unit with a transport refrigeration system.

FIG. 1 illustrates a side view of a transport temperature controlled trailer unit 100 with a transport refrigeration system 110. The trailer unit 100 is installed on a frame 120 and has a plurality of side doors 112 and a rear door 114. The transport refrigeration system 110 is installed on a side wall of the trailer unit 100. The transport refrigeration system 110 is configured to transfer heat between an internal space 130 and the outside environment. In some embodiments, the transport refrigeration system 110 is a multizone system in which different zones or areas of the internal space 130 are controlled to meet different refrigeration requirements based on the cargo stored in the particular zone.

It will be appreciated that the embodiments described herein are not limited to trucks and trailer units. The embodiments described herein may be used in any other suitable temperature controlled apparatuses such as a ship board container, an air cargo cabin, an over the road truck cabin, etc. The refrigeration system may be a vapor-compressor type refrigeration system, or any other suitable refrigeration systems that can use refrigerant, cold plate technology, etc.

It will be appreciated that the embodiments described herein are not limited to trucks and trailer units. The embodiments described herein may be used in any other suitable temperature controlled apparatuses. The refrigeration system may be a vapor-compressor type refrigeration system, or any other suitable refrigeration systems that use refrigerant.

The transport refrigeration system 110 includes a wireless communication system 140 and a fuel tank 145. The wireless communication system 140 includes a network coordinator (not shown), an antenna 150, and a plurality of wireless end nodes 155. As shown in FIG. 1, the wireless end nodes 155 include a door sensor 155*a* for each of the side doors 112 and the rear door 114, and a fuel tank level sensor 155*b* for the fuel tank 145. In some embodiments, the wireless end nodes 155 can also include other types of sensors such as, for example, an air space temperature sensor, a humidity sensor, a cargo temperature center, etc. Also, the wireless end nodes 155 are sealed to prevent failure due to water ingress, extreme temperatures, UV exposure, exposure to oil/solvents, etc. The wireless communication system 140 is configured to communicate information regarding the transport temperature controlled trailer unit 100 to a controller unit (not shown) of the transport refrigeration system 110 for controlling the refrigeration of the internal space 130. In some embodiments, the wireless communication system 140 also includes one or more wired sensor modules (not shown) that are connected to the network coordinator via a wired connection. The wired sensor modules, like the wireless end nodes 155 can include, for example, a door sensor, a fuel tank sensor, an air space temperature sensor, a humidity sensor, a cargo temperature center, etc.

Figure 2:
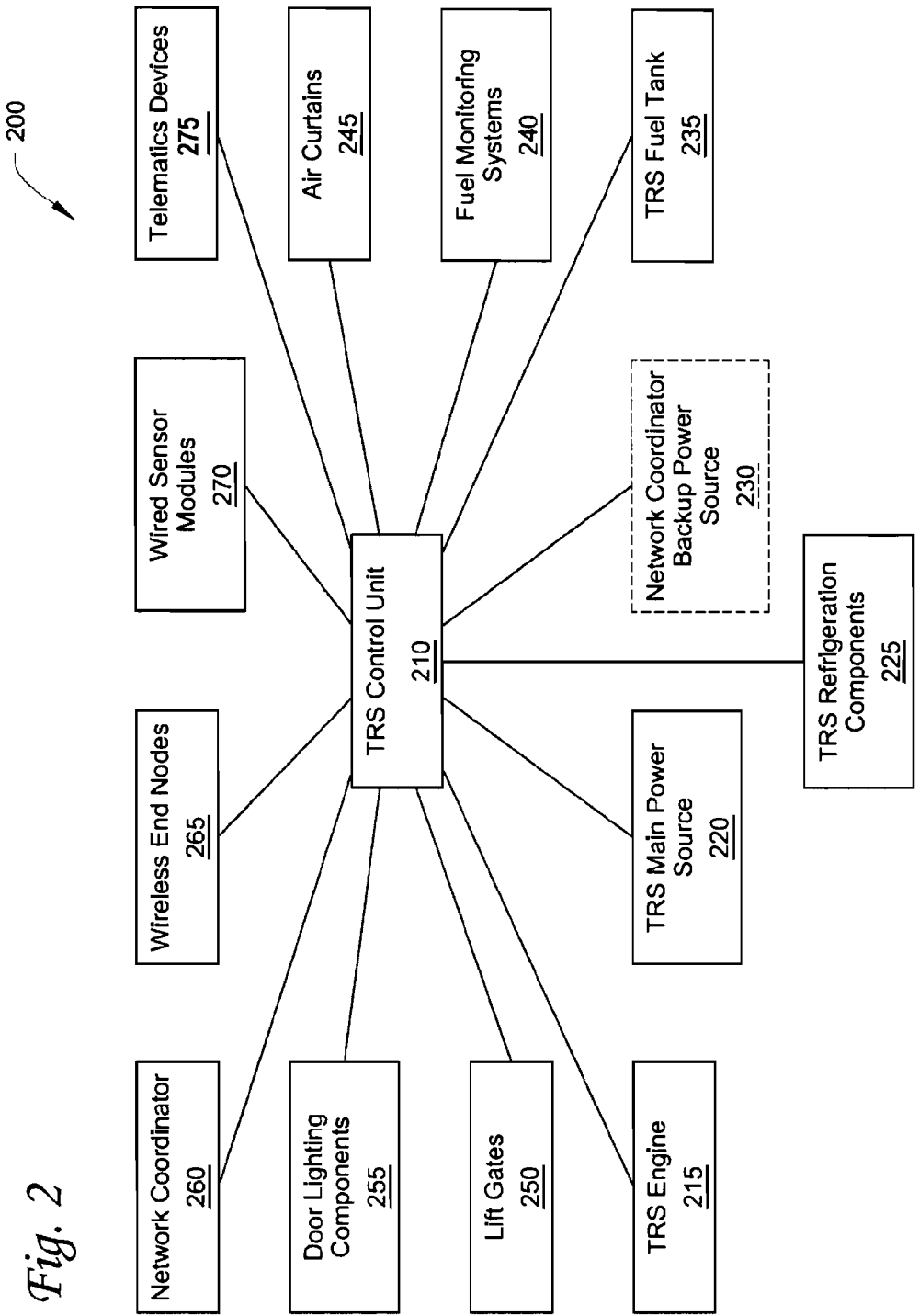
FIG. 2 illustrates a block diagram of a transport refrigeration system.

Referring to FIG. 2, a block diagram of one embodiment of a transport refrigeration system 200 for use on a reefer is described. The transport refrigeration system 200 includes a TRS control unit 210 that is connected to a TRS engine 215, a TRS main power source 220, TRS refrigeration components 225 (e.g., evaporator, blower, heat exchanger, etc.) and a TRS fuel tank 235. In one embodiment, the TRS main power source 220 is a ~12 volt battery. In some embodiments, the transport refrigeration system 200 can optionally include a TRS backup power source 230. In one embodiment, the TRS backup power source 230 is a ~6 volt battery. Each of the above components is part of the native control of the transport refrigeration system 200.

The transport refrigeration system 200 also includes one or more of the following parasitic electronic devices: a fuel monitoring system 240, one or more air curtains 245, one or more lift gates 250, one or more door lighting components 255, one or more telematics devices 275, a network coordinator 260, one or more wireless end nodes 265 and one or more wired sensor modules 270. The transport refrigeration system 200 may also include other parasitic electronic devices not listed above that can also drain power from the transport refrigeration system 200 when the TRS control unit 210 is off and are not part of the native control of the transport refrigeration system 200. Each of the parasitic electronic devices are connected to the TRS control unit 210. When the TRS control unit 210 is off, the parasitic electronic devices can deplete the charge of the TRS main power source 220 to a level below the level necessary to restart the TRS engine 215 and activate the TRS refrigeration components 225.

FIG. 3 illustrates one embodiment of a process 300 for preserving the life of a transport refrigeration system main power source. The flowchart 300 begins at 305, where a network coordinator, such as the network coordinator 260 in FIG. 2, operates as a parasitic load. At 310, the network coordinator determines whether the TRS control unit is powered on or powered off. If the TRS control unit is powered on, the process 300 proceeds to step 315. If the TRS control unit is powered off, the process 300 proceeds to 325.

At 315, the network coordinator ensures that the transport refrigeration system is set to the normal operation mode and all components of the transport refrigeration system are activated. The process 300 then proceeds to 320, where the TRS control unit waits a time period X1 and then proceeds back to 310. The time period X1 is variable and can be set by the user. In one embodiment, the time period X1 can be between ~1 to ~2 minutes.

At 325, then the TRS control unit is powered off, the network coordinator reads an input voltage at the network coordinator. At 330, the network coordinator determines whether the input voltage is less than a threshold voltage T1 for a time period X2 to determine whether the TRS main power source is drained. The threshold voltage T1 and the time period X2 are variable and the threshold voltage T1 can be set by the user based on the type of TRS main power source being used and the time period X2 can be set by the user based on the time period for the longest crank event. In one embodiment, when the TRS main power source is a ~12 volt battery the threshold voltage T1 can be ~11.2 volts and the time period X2 can be between ~1 to ~2 minutes. If the input voltage at the network coordinator is not less than the threshold voltage T1 for the time period X2, the process 300 proceeds back to 315. If the input voltage at the network coordinator is less than the threshold voltage T1 for the time period X2 seconds, the process 300 proceeds to step 335.

At 335, the network coordinator attempts to obtain a voltage of a network coordinator backup power source. At 340, the network coordinator determines whether the transport refrigeration system includes a network coordinator backup power source based on the voltage reading at 335. If a voltage above a threshold voltage T2 is obtained, the network coordinator determines that a network coordinator backup power source is present and the process 300 proceeds to 345. If a voltage below the threshold voltage T2 is obtained, the network coordinator determines that a network coordinator backup power source is not present and the process 300 proceeds to 380. The threshold voltage T2 is variable and can be set by the user. In one embodiment, the threshold voltage T2 can be set to 0 volts.

At 345, the network coordinator switches the power source to obtain power from the network coordinator backup power source instead of the TRS main power source to allow the TRS main power source to be recharged. At 350, the network coordinator reads an input voltage of the network coordinator backup power source. At 355, the network coordinator determines whether the network coordinator backup power source is drained by determining whether the input voltage of the network coordinator backup power source is less than a voltage threshold T3. The threshold voltage T3 is variable and can be set by the user based on the type of TRS backup power source being used. In one embodiment, the threshold voltage T3 can be set to ~4 volts if the TRS backup power source is a ~6 volt battery pack.

If the network coordinator determines that the input voltage of the network coordinator backup power source is not less than the voltage threshold T3, the network coordinator determines that the network coordinator backup power source is not drained and the process 300 proceeds to 360. If the network coordinator determines that the input voltage of the network coordinator backup power source is less than the voltage threshold T3, the network coordinator determines that the network coordinator backup power source is drained and the process 300 proceeds to 380.

At 360, the network coordinator then reads the input voltage of the TRS main power source. At 365, the network coordinator determines whether the TRS main power source has been recharged by determining whether the input voltage of the TRS main power source is less than a threshold voltage T1 for a time period X2 at 370. As discussed above, the threshold voltage T1 and the time period X2 are variable and the threshold voltage T1 can be set by the user based on the type of power source being used and the time period X2 can be set by the user based on the time period for the longest crank event. In one embodiment, when the TRS main power source is a ~12 volt battery the threshold voltage T1 can be ~11.2 volts and the time period X2 can be between ~1 to ~2 minutes. If the input voltage from the TRS main power source is not less than the threshold voltage T1 for the time period X2, the process 300 proceeds to 370. If the input voltage from the TRS main power source is less than the threshold voltage T1 for the time period X2, the process 300 proceeds to 375.

At 370, the network coordinator switches the power source to obtain power from the TRS main power source instead of the network coordinator backup power source. The process 300 then proceeds back to 315.

At 375, the network coordinator waits a time period X3 and then proceeds back to 350. The time period X3 is variable and can be set by the user. In one embodiment, the time period X3 can be between ~1 to ~2 minutes.

At 380, the TRS control unit instructs all electronics devices of the transport refrigeration system (including the parasitic electronic devices in the transport refrigeration system) to operate in a hibernation mode in which the electronic devices are powered down to reduce the amount of current drawn from the TRS main power source. During the hibernation mode, the electronic devices can still draw sufficient current to monitor and respond to an interrupt request from a user or the TRS control unit. Also, the electronic devices can still draw sufficient current to switch back from a hibernation mode to a normal operation mode. By placing the electronic devices in the hibernation mode, the life of the TRS main power source can be preserved. The process 300 then proceeds to 385.

At 385, the TRS control unit wakes up from the hibernation mode after a time period X4 and reads the input voltage from the TRS main power source. The time period X4 is variable and can be set by the user. In one embodiment, the time period X4 can be set to more than ~5 minutes.

The TRS control unit then determines, at 390, whether the input voltage read from the TRS main power source is greater than a voltage threshold T4. The threshold voltage T4 is variable and can be set by the user based on the type of TRS main power source being used. In one embodiment, the threshold voltage T4 can be set between ~11.9 volts and ~15 volts to ensure operation of the TRS control unit. If the input voltage read from the TRS main power source is greater than the voltage threshold T4, the process 300 proceeds back to 315. If the input voltage read from the TRS main power source is not greater than the voltage threshold T4, the process 300 proceeds back to 340.

ASPECTS

It is noted that any of aspects 1-8 below can be combined with any of aspects 9-16.

1. A method for preserving the life of a transport refrigeration system power source comprising:
    determining whether a control unit of the transport refrigeration system is off;
    measuring an input voltage of the transport refrigeration system power source when the control unit is off;
    instructing, via the network coordinator, one or more parasitic electronic devices of the transport refrigeration system to operate in a hibernation mode when the input voltage of the transport refrigeration system power source remains below a voltage threshold value for a time period and the control unit is off.

2. The method of aspect 1, further comprising:
    determining whether the transport refrigeration system includes a network coordinator backup power source; and
    instructing the one or more parasitic electronic devices of the transport refrigeration mode to operate in the hibernation mode when the input voltage of the transport refrigeration system power source remains below the voltage threshold value for the time period, the control unit is off, and the transport refrigeration system does not include the network coordinator backup power source.

3. The method of aspects 1-2, further comprising:
    detecting whether the transport refrigeration system includes a network coordinator backup power source; and
    switching the network coordinator to receive power from the network coordinator backup power source instead of the transport refrigeration system power source when the network coordinator backup power source is detected and an input voltage of the network coordinator backup power source is greater than or equal to a second voltage threshold value.

4. The method of aspects 1-3, wherein the one or more parasitic electronic devices includes one or more of a fuel monitoring system, an air curtain, a lift gate, a door lighting component, a telematics device, the network coordinator, a wireless end node, and a wired sensor module.

5. The method of aspect 1-4, wherein the voltage threshold value is 11.2 volts and the time period is between one and two minutes.

6. The method of aspect 3, wherein the second voltage threshold value is four volts when the network coordinator backup power source is a six volt battery pack.

7. The method of aspects 1-6, further comprising:
    waking the transport refrigeration system control unit from the hibernation mode after a second time period when one or more parasitic electronic devices of the transport refrigeration system is operating in the hibernation mode;
    the transport refrigeration system control unit determining whether the input voltage of the transport refrigeration system power source is greater than a third voltage threshold value; and
    setting the transport refrigeration system to operate in the normal operation mode when the transport refrigeration system control unit determines that the input voltage of the transport refrigeration system power source is greater than the third voltage threshold value.

8. The method of aspect 7, wherein the second time period is four minutes and the third voltage threshold value is between 11.9 volts and 15 volts.

9. A transport refrigeration system comprising:
    a transport refrigeration system control unit;
    an engine connected to the control unit;
    a transport refrigeration system power source connected to the transport refrigeration system control unit and the engine;
    a network coordinator connected to the transport refrigeration system control unit; and
    one or more parasitic electronic devices that are connected to the transport refrigeration system control unit and the transport refrigeration system power source, the one or more parasitic electronic devices configured to draw current from the transport refrigeration system power source when the transport refrigeration system control unit is off,
    wherein the network coordinator is configured to instruct the one or more parasitic electronic devices to operate in a hibernation mode when the transport refrigeration system control unit is off and an input voltage of the transport refrigeration system power source remains below a voltage threshold for a time period.

10. The transport refrigeration system of aspect 9,
    wherein the network coordinator is configured to determine whether the transport refrigeration system includes a network coordinator backup power source, and
    the network coordinator is configured to instruct the one or more parasitic electronic devices of the transport refrigeration system to operate in the hibernation mode when the input voltage of the transport refrigeration system power source remains below the voltage threshold value for the time period, the control unit is off, and the transport refrigeration system does not include the network coordinator backup power source.

11. The transport refrigeration system of aspects 9-10,
wherein the network coordinator is configured to detect whether the transport refrigeration system includes a network coordinator backup power source; and
wherein the network coordinator is configured to receive power from the network coordinator backup power source instead of the transport refrigeration system power source when the network coordinator backup power source is detected and an input voltage of the network coordinator backup power source is greater than or equal to a second voltage threshold value.

12. The transport refrigeration system of aspects 9-11, wherein the one or more parasitic electronic devices includes one or more of a fuel monitoring system, an air curtain, a lift gate, a door lighting component, a telematics device, the network coordinator, a wireless end node, and a wired sensor module.

13. The transport refrigeration system of aspects 9-12, wherein the voltage threshold value is 11.2 volts and the time period is between one and two minutes.

14. The transport refrigeration system of aspect 11, wherein the second voltage threshold value is four volts when the network coordinator backup power source is a six volt battery pack.

15. The transport refrigeration system of aspects 1-9,
wherein the transport refrigeration system control unit is configured to wake up from the hibernation mode after a second time period when one or more parasitic electronic devices of the transport refrigeration system is operating in the hibernation mode,
wherein the transport refrigeration system control unit is configured to determine whether the input voltage of the transport refrigeration system power source is greater than a third voltage threshold value, and
wherein the transport refrigeration system control unit is configured to set the transport refrigeration system to operate in the normal operation mode when the transport refrigeration system control unit determines that the input voltage of the transport refrigeration system power source is greater than the third voltage threshold value.

16. The transport refrigeration system of aspect 15, wherein the second time period is four minutes and the third voltage threshold value is between 11.9 volts and 15 volts.

With regard to the foregoing description, it is to be understood that changes may be made in detail, especially in matters of the construction materials employed and the shape, size and arrangement of the parts without departing from the scope of the present invention. It is intended that the specification and depicted embodiment to be considered exemplary only, with a true scope and spirit of the invention being indicated by the broad meaning of the claims.

What claimed is:
1. A method for preserving the life of a transport refrigeration system power source comprising:
   a network coordinator managing, commanding, directing and regulating the behavior of a plurality of wireless end nodes of a wireless communication system of a transport refrigeration system (TRS);
   a TRS control unit managing, commanding, directing and regulating a behavior of an evaporator, a blower, a heat exchanger of the TRS;
   the network coordinator determining whether a TRS control unit of the transport refrigeration system is off, the network coordinator being separate from and connected to the TRS control unit;
   measuring an input voltage of the transport refrigeration system power source when the control unit is off;
   instructing, via the network coordinator, one or more parasitic electronic devices of the transport refrigeration system to operate in a hibernation mode when the network coordinator determines that the input voltage of the transport refrigeration system power source remains below a voltage threshold value for a time period and the control unit is off;
   the network coordinator detecting whether the transport refrigeration system includes a network coordinator backup power source;
   the TRS control unit instructing the one or more parasitic electronic devices of the transport refrigeration mode to operate in the hibernation mode when the input voltage of the transport refrigeration system power source remains below the voltage threshold value for the time period, the control unit is off, and the transport refrigeration system does not include the network coordinator backup power source;
   the network coordinator switching the network coordinator to receive power from the network coordinator backup power source instead of the transport refrigeration system power source when the network coordinator backup power source is detected and an input voltage of the network coordinator backup power source is greater than or equal to a second voltage threshold value;
   waking the TRS control unit from the hibernation mode after a second time period when one or more parasitic electronic devices of the transport refrigeration system is operating in the hibernation mode;
   the TRS control unit determining whether the input voltage of the transport refrigeration system power source is greater than a third voltage threshold value;
   setting the transport refrigeration system to operate in the normal operation mode when the TRS control unit determines that the input voltage of the transport refrigeration system power source is greater than the third voltage threshold value;
   wherein the one or more parasitic electronic devices includes a fuel monitoring system, an air curtain, a lift gate, a door lighting component, a telematics device, the network coordinator, one or more of the plurality of wireless end nodes, and a wired sensor module.

2. The method of claim 1, wherein the voltage threshold value is 11.2 volts and the time period is between one and two minutes.

3. The method of claim 1, wherein the second voltage threshold value is four volts when the network coordinator backup power source is a six volt battery pack.

4. The method of claim 1, wherein the second time period is four minutes and the third voltage threshold value is between 11.9 volts and 15 volts.

5. A transport refrigeration system (TRS) comprising:
   an evaporator;
   a blower;
   a heat exchanger;
   a TRS control unit configured to manage, command, direct and regulate a behavior of the evaporator, the blower, the heat exchanger;
   an engine connected to the TRS control unit;
   a transport refrigeration system power source connected to the TRS control unit and the engine;

a wireless communication system including a plurality of wireless end nodes and a network coordinator configured to manage, command, direct and regulate the behavior of the plurality of wireless end nodes, the network coordinator being separate from and connected to the TRS control unit; and one or more parasitic electronic devices that are connected to the TRS control unit and the transport refrigeration system power source, the one or more parasitic electronic devices configured to draw current from the transport refrigeration system power source when the TRS control unit is off, wherein the network coordinator is configured to instruct the one or more parasitic electronic devices to operate in a hibernation mode when the TRS control unit is off and an input voltage of the transport refrigeration system power source remains below a voltage threshold for a time period, wherein the network coordinator is configured to detect whether the transport refrigeration system includes a network coordinator backup power source, wherein the network coordinator is configured to instruct the one or more parasitic electronic devices of the transport refrigeration system to operate in the hibernation mode when the input voltage of the transport refrigeration system power source remains below the voltage threshold value for the time period, the control unit is off, and the transport refrigeration system does not include the network coordinator backup power source, wherein the network coordinator is configured to receive power from the network coordinator backup power source instead of the transport refrigeration system power source when the network coordinator backup power source is detected and an input voltage of the network coordinator backup power source is greater than or equal to a second voltage threshold value, wherein the one or more parasitic electronic devices includes a fuel monitoring system, an air curtain, a lift gate, a door lighting component, a telematics device, the network coordinator, one or more of the plurality of wireless end nodes, and a wired sensor module wherein the TRS control unit is configured to wake up from the hibernation mode after a second time period when one or more parasitic electronic devices of the TRS is operating in the hibernation mode, wherein the TRS control unit is configured to determine whether the input voltage of the transport refrigeration system power source is greater than a third voltage threshold value, and wherein the TRS control unit is configured to set the TRS to operate in the normal operation mode when the TRS control unit determines that the input voltage of the transport refrigeration system power source is greater than the third voltage threshold value.

6. The transport refrigeration system of claim 5, wherein the voltage threshold value is 11.2 volts and the time period is between one and two minutes.

7. The transport refrigeration system of claim 5, wherein the second voltage threshold value is four volts when the network coordinator backup power source is a six volt battery pack.

8. The transport refrigeration system of claim 5, wherein the second time period is four minutes and the third voltage threshold value is between 11.9 volts and 15 volts.

* * * * *